(12) United States Patent
Lauder

(10) Patent No.: US 10,676,182 B2
(45) Date of Patent: Jun. 9, 2020

(54) TILTING COAXIAL ROTOR FOR A ROTARY WING AIRCRAFT

(71) Applicant: Sikorsky Aircraft Corporation, Stratford, CT (US)

(72) Inventor: Timothy F. Lauder, Oxford, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 397 days.

(21) Appl. No.: 15/655,665

(22) Filed: Jul. 20, 2017

(65) Prior Publication Data

US 2019/0023383 A1 Jan. 24, 2019

(51) Int. Cl.
| | | |
|---|---|---|
| *B64C 27/10* | (2006.01) | |
| *B64C 27/35* | (2006.01) | |
| *B64C 27/52* | (2006.01) | |
| *B64C 27/59* | (2006.01) | |
| *B64D 27/24* | (2006.01) | |
| *B64C 27/68* | (2006.01) | |
| *B64C 27/12* | (2006.01) | |

(52) U.S. Cl.
CPC .............. *B64C 27/10* (2013.01); *B64C 27/12* (2013.01); *B64C 27/35* (2013.01); *B64C 27/52* (2013.01); *B64C 27/59* (2013.01); *B64C 27/68* (2013.01); *B64D 27/24* (2013.01)

(58) Field of Classification Search
CPC ......... B64C 27/10; B64C 27/68; B64C 27/12; B64C 27/35; B64C 27/52; B64C 27/59; B64D 27/24
See application file for complete search history.

(56) References Cited

U.S. PATENT DOCUMENTS

| | | | |
|---|---|---|---|
| 1,936,542 A | 11/1933 | Nardone | |
| 3,362,255 A | 1/1968 | De Rocca et al. | |
| 4,558,770 A | 12/1985 | Woodruff | |
| 4,690,390 A | 9/1987 | Kish | |
| 4,729,753 A * | 3/1988 | Neathery | ................ B64C 27/35 |
| | | | 416/102 |
| 4,899,957 A | 2/1990 | Eickmann | |
| 4,938,333 A | 7/1990 | Kish | |

(Continued)

FOREIGN PATENT DOCUMENTS

| | | |
|---|---|---|
| CN | 1857965 A | 11/2006 |
| CN | 101244762 A | 8/2008 |

(Continued)

OTHER PUBLICATIONS

Timothy Fred Lauder, U.S. Appl. No. 15/434,951, filed Feb. 16, 2017; Non-Provisional Application Titled: Electric Propulsion System With Overrunning Clutch for a Rotary-Wing Aircraft.

(Continued)

*Primary Examiner* — Assres H Woldemaryam
(74) *Attorney, Agent, or Firm* — Cantor Colburn LLP

(57) ABSTRACT

An electric propulsion system includes a static mast fixed to the airframe and a secondary mast positioned in overlapping arrangement with the static mast. The secondary mast defines an axis of rotation. An elastomeric bearing is arranged at an interface between the static mast and the secondary mast. An actuator assembly includes at least one actuator connected to the secondary mast. The actuator assembly is operable to pivot the secondary mast relative to the axis of rotation.

20 Claims, 3 Drawing Sheets

FIG. 2

(56) References Cited

U.S. PATENT DOCUMENTS

| | | |
|---|---|---|
| 5,188,511 A | 2/1993 | Ebert |
| 5,271,295 A | 12/1993 | Marnot |
| 5,749,449 A | 5/1998 | Kearney et al. |
| 6,484,967 B2 | 11/2002 | Protte |
| 6,823,972 B2 | 11/2004 | Gmirya |
| 7,083,142 B2 | 8/2006 | Scott |
| 7,229,251 B2 | 6/2007 | Bertolotti et al. |
| 7,621,480 B2 | 11/2009 | Darrow, Jr. et al. |
| 8,181,902 B2 | 5/2012 | Schlunke |
| 8,235,324 B1 | 8/2012 | Birch et al. |
| 8,531,072 B2 | 9/2013 | Wishart |
| 8,628,042 B2 | 1/2014 | Imbert et al. |
| 8,844,880 B1 | 9/2014 | Corliss |
| 8,851,415 B1 | 10/2014 | Lugg |
| 8,931,732 B2 | 1/2015 | Sirohi et al. |
| 8,948,928 B2 | 2/2015 | Alber et al. |
| 9,004,395 B2 | 4/2015 | Botti |
| 9,272,779 B2 * | 3/2016 | Groenewald ........... B64C 27/10 |
| 9,446,842 B2 | 9/2016 | Luyks |
| 9,584,000 B2 | 2/2017 | Ruan et al. |
| 9,725,179 B2 | 8/2017 | Aubert et al. |
| 9,828,069 B2 | 11/2017 | Lauder et al. |
| 10,053,207 B2 | 8/2018 | Cox |
| 10,116,187 B1 | 10/2018 | Wishart |
| 2009/0140095 A1 * | 6/2009 | Sirohi ..................... B64C 27/22 244/17.19 |
| 2010/0209242 A1 * | 8/2010 | Popelka ................ B64C 27/001 416/1 |
| 2011/0015034 A1 | 1/2011 | Ehinger et al. |
| 2012/0074820 A1 | 3/2012 | Takeuchi |
| 2013/0126669 A1 | 5/2013 | Hamann et al. |
| 2013/0170985 A1 | 7/2013 | Altmikus et al. |
| 2014/0302938 A1 * | 10/2014 | Lidak ....................... F16D 3/30 464/125 |
| 2014/0316608 A1 * | 10/2014 | Alber ................... B64C 39/022 701/2 |
| 2015/0093272 A1 | 4/2015 | Komer et al. |
| 2017/0040870 A1 | 2/2017 | Ballauf |
| 2017/0167317 A1 | 6/2017 | Lee et al. |
| 2017/0253328 A1 | 9/2017 | Wang |
| 2018/0002005 A1 | 1/2018 | Groenewald |
| 2018/0105263 A1 * | 4/2018 | Lauder .................... B64C 27/14 |
| 2018/0229835 A1 * | 8/2018 | Lauder .................... B64C 27/14 |
| 2019/0023384 A1 | 1/2019 | Lauder |
| 2019/0210717 A1 | 7/2019 | Lauder |

FOREIGN PATENT DOCUMENTS

| | | |
|---|---|---|
| GB | 2360752 A | 10/2001 |
| JP | 4742390 B2 | 8/2011 |
| JP | 2014149075 A | 8/2014 |
| WO | 2005100154 A1 | 10/2005 |
| WO | 2016128330 A1 | 8/2016 |

OTHER PUBLICATIONS

Timothy Fred Lauder, U.S. Appl. No. 62/244,361, filed Oct. 21, 2015; Provisional Application Titled: Electric Propulsion System for a Rotary Wing Aircraft.

Timothy Fred Lauder, U.S. Appl. No. 15/010,970, filed Jan. 29, 2016; Non-Provisional Application Titled: Rotor Drive Systems for Rotorcraft.

Timothy Fred Lauder, U.S. Appl. No. 15/295,258, filed Oct. 17, 2016; Non-Provisional Application Titled: Electric Propulsion System for a Rotary Wing Aircraft.

Timothy Fred Lauder, U.S. Appl. No. 15/296,625, filed Oct. 18, 2016; Non-Provisional Application Titled: Electric Propulsion System for a Rotary Wing Aircraft.

Non-Final Office Action, U.S. Appl. No. 15/295,258; filed Oct. 17, 2016; An Electric Propulsion System for Rotary Wing Aircraft; dated Dec. 2, 2019, pp. 1-48.

* cited by examiner

TILTING COAXIAL ROTOR FOR A ROTARY WING AIRCRAFT

BACKGROUND

The present disclosure relates to a rotary wing aircraft, and more particularly, to a rotary wing aircraft having an electric propulsion system.

Conventional rotary-wing aircraft typically utilize a mechanical drive train to transmit power from one or more engines to drive main and tail rotor systems. The helicopter mechanical drive train may include a main rotor gearbox, an intermediate gearbox, a tail rotor gearbox and their interconnecting shafts. The main rotor gearbox converts the high speed input from each engine to a low speed output for the main rotor system. The main rotor gearbox may also provide power take-offs to drive an anti-torque system, a hydraulic system and other such systems. Elimination of the main gearbox and hydraulic systems may result in a significant reduction in aircraft weight and maintenance requirements.

SUMMARY

According to an embodiment, an electric propulsion system includes a static mast fixed to the airframe and a secondary mast positioned in overlapping arrangement with the static mast. The secondary mast defines an axis of rotation. An elastomeric bearing is arranged at an interface between the static mast and the secondary mast. An actuator assembly includes at least one actuator connected to the secondary mast. The actuator assembly is operable to pivot the secondary mast relative to the axis of rotation.

In addition to one or more of the features described above, or as an alternative, in further embodiments the secondary mast is pivotable up to 10 degees relative to the axis of rotation about a 360 degee azimuth.

In addition to one or more of the features described above, or as an alternative, in further embodiments the at least one actuator is positioned between the static mast and the secondary mast.

In addition to one or more of the features described above, or as an alternative, in further embodiments the at least one actuator includes at least one first actuator operable to move the secondary mast and the axis of rotation relative to the static mast in a lateral direction and at least one second actuator operable to move the secondary mast and the axis of rotation relative to the static mast in a longitudinal direction.

In addition to one or more of the features described above, or as an alternative, in further embodiments the secondary mast has a first end having a first diameter and a second end having a second diameter, the first diameter and the second diameter being different.

In addition to one or more of the features described above, or as an alternative, in further embodiments the secondary mast is generally frusto-conical in shape.

In addition to one or more of the features described above, or as an alternative, in further embodiments comprising a first rotor assembly mounted to an exterior surface of the secondary mast. The first rotor assembly includes a plurality of first rotor blades rotatable about the axis of rotation in a first direction. A second rotor assembly is mounted to the exterior surface of the secondary mast. The second rotor assembly includes a plurality of second rotor blades rotatable about the axis of rotation in a second direction, opposite the first direction.

In addition to one or more of the features described above, or as an alternative, in further embodiments the elastomeric bearing is positioned vertically between the first rotor assembly and the second rotor assembly.

In addition to one or more of the features described above, or as an alternative, in further embodiments comprising a first electric motor operable to drive the plurality of first rotor blades about the axis of rotation and a second electric motor operable to drive the plurality of second rotor blades about the axis of rotation.

In addition to one or more of the features described above, or as an alternative, in further embodiments comprising a first blade pitch actuator mounted within the first rotor assembly and operably coupled to one of the first plurality of rotor blades. The first pitch actuator is operable to rotate the first rotor blade about a blade pitch axis. A second pitch actuator is mounted within the second rotor assembly and operably coupled to one of the second plurality of rotor blades. The second pitch actuator is operable to rotate the second rotor blade about a blade pitch axis.

According to another embodiment, a rotary-wing aircraft includes an airframe and a rotor assembly. The rotor assembly includes a static mast fixed to the airframe and a secondary mast movably mounted about the static mast. The secondary mast defines an axis of rotation. An elastomeric bearing couples the secondary mast to the static mast. An actuator assembly includes at least one actuator connected to the secondary mast. The actuator assembly is operable to pivot the secondary mast relative to the axis of rotation. A first rotor is rotatable about the rotor axis in a first direction and a second rotor coaxial with the first rotor is rotatable about the rotor axis in a second, opposite direction.

In addition to one or more of the features described above, or as an alternative, in further embodiments the at least one actuator assembly is operable to control blade pitch and yaw of the rotary-wing aircraft.

In addition to one or more of the features described above, or as an alternative, in further embodiments the at least one actuator assembly is mounted in a fixed reference.

In addition to one or more of the features described above, or as an alternative, in further embodiments the at least one actuator assembly is mounted to the airframe.

In addition to one or more of the features described above, or as an alternative, in further embodiments the at least one actuator assembly is coupled to the secondary mast via a ball and socket connection.

In addition to one or more of the features described above, or as an alternative, in further embodiments comprising a first electric motor configured to drive the first rotor about the rotor axis, the first electric motor being mounted at least partially within a rotor hub of the first rotor. A second electric motor is configured to drive the second rotor about the rotor axis, the second electric motor being mounted at least partially within a rotor hub of the second rotor.

In addition to one or more of the features described above, or as an alternative, in further embodiments comprising a first pitch actuator associated with the first rotor, the first pitch actuator being operable to rotate at least one rotor blade of the first rotor about a blade pitch axis. A second pitch actuator is associated with the second rotor, the second pitch actuator being operable to rotate at least one rotor blade of the second rotor about a blade pitch axis.

In addition to one or more of the features described above, or as an alternative, in further embodiments the first pitch actuator and the second pitch actuator provide a quasi-static input for thrust and yaw control.

In addition to one or more of the features described above, or as an alternative, in further embodiments power for operating the first pitch actuator is generated and managed within the first rotor and power for operating the second pitch actuator is generated and managed within the second rotor.

In addition to one or more of the features described above, or as an alternative, in further embodiments the secondary mast is pivotable up to 10 degees relative to the rotor axis about a 360 degee azimuth.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
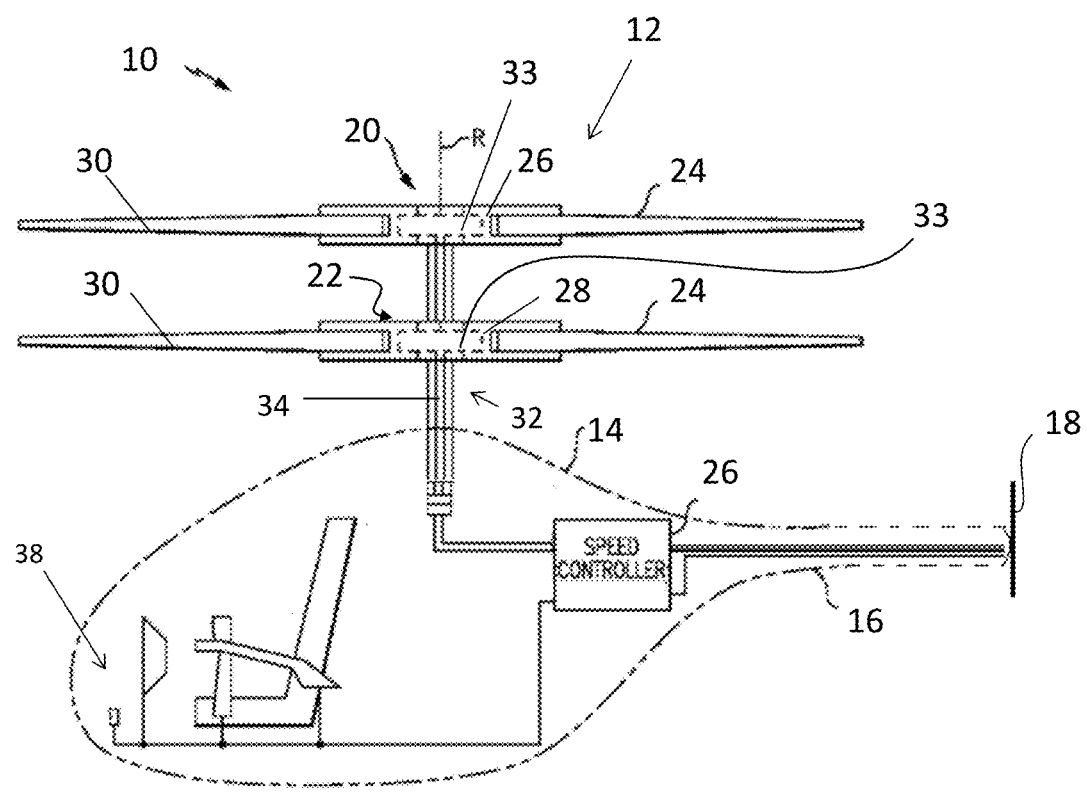
FIG. 1 is a schematic diagram of an example of a rotary wing aircraft.

FIG. 1 schematically illustrates an example of a vertical takeoff and landing (VTOL) rotary wing aircraft 10. The aircraft 10 in the non-limiting embodiment of FIG. 1 includes a dual, counter-rotating main rotor system 12, rotatable about an axis of rotation R, supported by an airframe 14 having an extending tail 16 which mounts a thrusting device system 18, such as an auxiliary propulsion system. The dual, counter-rotating, coaxial rotor system 12, includes an upper rotor system 20 and a lower rotor system 22. Each rotor system 20, 22 includes a plurality of rotor blade assemblies 24 mounted to a rotor hub assembly 26, 28 for rotation about the rotor axis of rotation R.

The plurality of main rotor blade assemblies 24 project substantially radially outward from the hub assemblies 26, 28. Any number of main rotor blade assemblies 24 may be used with the rotor system 12. Each rotor blade assembly 24 of the rotor system 12 includes a rotor blade 30 mounted to a corresponding hub assemblies 26, 28 in a manner to permit the rotor blade 30 to pitch about a pitch axis P. It should be understood that various blade attachments may be utilized with the aircraft 10. Although a particular helicopter configuration is schematically illustrated in the disclosed non-limiting embodiments, other configurations and/or machines, such as Unmanned Air Vehicles, high speed compound rotary wing aircraft with supplemental translational thrust systems, tilt-rotors and tilt-wing aircraft in either manned or unmanned configurations will also benefit here from.

At least one of the main rotor system 12 and the antitorque system 18 is configured as an electric propulsion system 32 that generally integrates a direct drive electric motor 33 into the rotary-wing aircraft 10. In such embodiments, the propulsion system 32 includes a static mast 34 that is generally stationary relative to the airframe 14 of the aircraft 10. The one or more electric motors of the propulsion system 32 may be controlled by an electronic speed controller 36 over a wide range of speeds in response to a flight control system 38.

Figure 2:
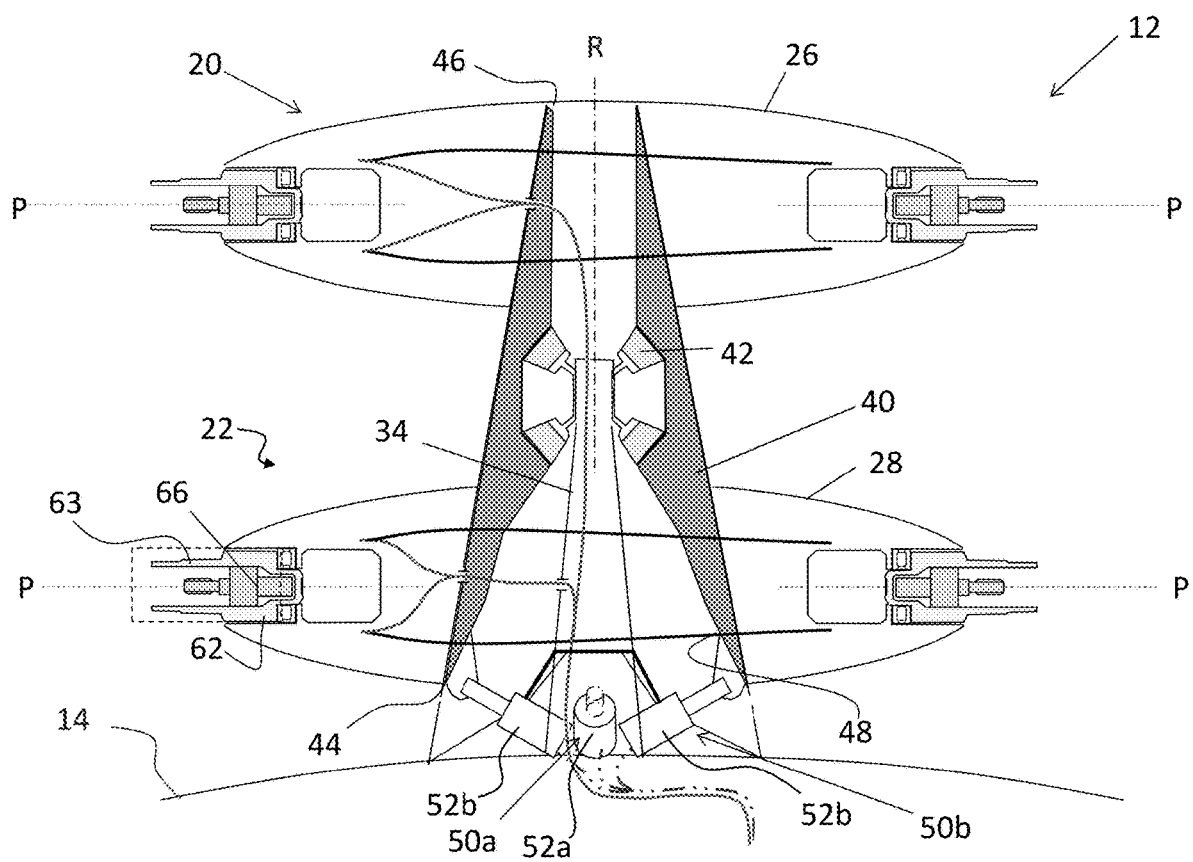
FIG. 2 is a cross-sectional view of a propulsion system of a rotary wing aircraft according to an embodiment.
Figure 3:
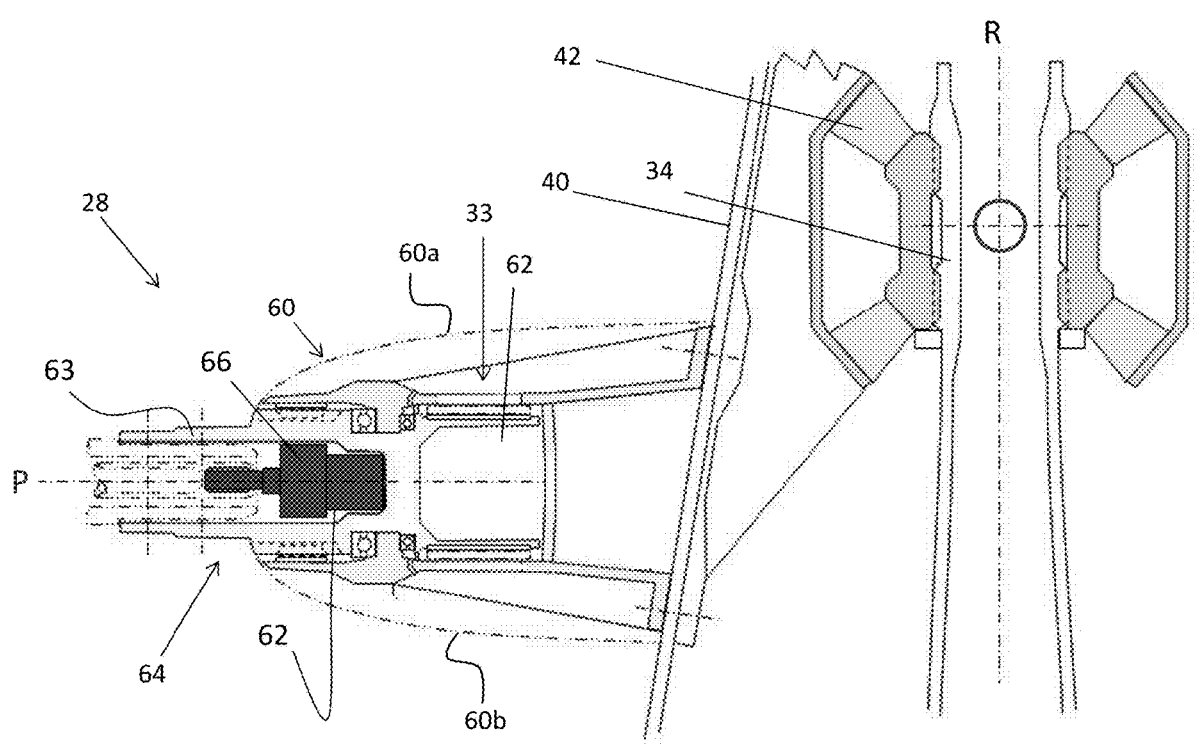
FIG. 3 is a detailed cross-sectional view of a portion of the propulsion system of FIG. 2 according to an embodiment.

With reference now to FIGS. 2-3, the main rotor system 12 of the aircraft 10 is illustrated in more detail. As shown, the main rotor system 12 includes a static mast 34 that is generally stationary relative to the airframe 14. A movable mast 40 is mounted to the static mast 34 via an elastomeric bearing 42, such as a gimbal bearing for example. The movable mast does not rotate about the axis of rotation R; however, the movable mast 40, and therefore the upper and lower rotor assemblies 20, 22 coupled thereto, is able to pivot or articulate relative to the static mast 34 and the airframe 14 via the elastomeric bearing 42. As shown in the FIGS., a first end of the movable mast 40 is offset from the exterior surface of the airframe 14 by a distance to avoid interference between the mast 40 and the airframe 14 when the movable mast 40 is tilted.

In the illustrated, non-limiting embodiment, the movable mast 40 is generally frusto-conical in shape. In such embodiments, a first end 44 of the movable mast 40 adjacent the airframe 14 has a first diameter, and the second, distal end 46 of the movable mast 40 has a second diameter, the first diameter being greater than the second diameter. By selecting a configuration of the movable mast 40 with an increased diameter adjacent the airframe 14, interference or contact between the movable mast 40 and the static mast 34 during movement of the movable mast 40 is avoided. However, it should be understood that a movable mast 40 having other suitable shapes, including those having a substantially uniform cross-section are also contemplated herein.

At least one actuation assembly 50 is mounted to the airframe 14 and operably coupled to the movable mast 40. As shown, the at least one actuation assembly 50 may be positioned within the area defined between the static mast 34 and the interior surface 48 of the movable mast 40. In an embodiment, an actuator 52 of the at least one actuation assembly 50 is directly coupled to the movable mast 40 via a ball and socket connection. The actuator 52 is operable to apply a force against the rotors gyroscopic moment transferred to the movable mast 40.

In the illustrated, non-limiting embodiment, the at least one actuation assembly 50 includes a first actuation assembly 50a and a second actuation assembly 50b configured to provide roll and pitch of the main rotor system 12, respectively. The first and second actuation assemblies 50a, 50b are operable to selectively apply a force against the gyroscopic moment of the movable mast 40. In combination, the first and second actuation assemblies 50a, 50b are operable to tilt the movable mast 40 between 5-10 degrees, such as between 6 and 8 degees for example, relative to vertical, in a 360 degee azimuth.

The first actuation assembly 50a is operable to control the tilt of the movable mast 40 relative to the static mast 34 in a lateral direction. In the illustrated, non-limiting embodiment, the first actuation assembly 50a includes a first lateral tilt actuator 52a and a second, substantially identical, lateral tilt actuator 52a. The first and the second lateral tilt actuators 52a may, but need not be spaced 180 degrees apart about the circumference of the static mast 34 as shown in FIG. 2. Each of the first and second lateral tilt actuators 52a may be operable to tilt the movable mast 40 in a first lateral direction and a second, opposite lateral direction. In such embodiments, the second lateral tilt actuator 52a is configured as a redundant actuator in the event that operation of the first lateral tilt actuator 52a fails. However, embodiments where the first lateral tilt actuator 52a is configured to tilt the movable mast 40 in a first lateral direction and the second lateral tilt actuator 52a is configured to tilt the movable mast 40 in a second, opposite lateral direction are also contemplated herein.

The second actuation assembly 50b is operable to control the tilt of the movable mast 40 relative to the static mast 34 in a longitudinal direction. Movement of the movable mast 40 in a plane defined by the longitudinal direction is generally perpendicular to the plane of movement defined by the lateral direction. The second actuation assembly 50b may similarly include a first and second, substantially identical, longitudinal tilt actuator 52b. The first longitudinal tilt actuator 52b and the second longitudinal tilt actuator 52b may, but need not be spaced 180 degees apart about the circumference of the static mast 34. The first and second longitudinal tilt actuators 52b may be operable to tilt the movable mast 40 in a first longitudinal direction and a second, opposite longitudinal direction. In such embodiments, the second longitudinal tilt actuator 52b is configured as a redundant actuator in the event that operation of the first longitudinal tilt actuator 52b fails. However, embodiments where the first longitudinal tilt actuator 52b is configured to tilt the movable mast 40 in a first longitudinal direction and the second longitudinal tilt actuator 52b is configured to tilt the movable mast 40 in a second, opposite longitudinal direction are also contemplated herein The upper rotor hub 26 and the lower rotor hub 28 are fixedly mounted about the exterior of the movable mast 40. In an embodiment, the upper and lower rotor hubs 26, 28 are arranged such that the elastomeric bearing 42 is vertically centered between the upper rotor hub 26 and the lower rotor hub 28. An example of a rotor assembly 20, 22 of the main rotor system 12 is illustrated in FIG. 3. Although the lower rotor assembly 22 is shown, it should be understood that the upper rotor assembly 20 may have a similar configuration as described herein. The rotor hub 28 of the rotor assembly 22 includes a housing 60 operable as a fairing to reduce the drag acting on the main rotor system 12. The housing 60 may include a plurality of complementary portions, such as an upper housing portion 60a and lower housing portion 60b. In an embodiment, the upper and lower housing portions 60a, 60b are substantially identical and symmetrical about the plane normal to the axis of rotation R and containing the pitch axis P of the plurality of blade assemblies 30 associated with the hub 28.

Arranged within an interior of the housing 60 is a rotor head or ring 62. The rotor ring 62 is configured to rotate about the axis of rotation R. The plurality of blade assemblies 24 of the rotor assembly 22 is mounted about the periphery of the rotor ring 62. Accordingly, adjacent ends of the upper and lower housing portions 60a, 60b are separated from one another to define a gap within which the rotor ring 62 and the plurality of rotor blades 30 rotate about the axis of rotation R, relative to hub 28 and the movable and stationary masts 34, 40.

The hub assembly 28 additionally includes an actuator assembly 64 for providing thrust and yaw control of the aircraft 10. The actuator assembly 64 may include at least one actuator 66 operably coupled to the plurality of rotor blades 30, to impart a desired pitch control to the rotor blades 30. The at least one actuator 66 is additionally configured to provide a quasi-static input. In an embodiment, the plurality of rotor blades 30 may be coupled via a mechanical linkage (not shown) such that rotation of a single rotor blade 30 about a pitch axis P (feather axis) via the actuator 66 causes a similar rotation of each of the plurality of blades 30 about a respective pitch axis P. Alternatively, the actuator assembly 64 includes a plurality of electrical actuators 66 directly or indirectly coupled to each of the plurality of rotor blades 30. In an embodiment, the actuators 66 are mounted to the rotor ring 62, or alternatively, at an interface between the rotor ring 62 and a respective rotor blade 30, such as a blade cuff 63 for example. The actuators 66 may be mounted concentrically with the rotor blades 30, or alternatively, may be offset therefrom and coupled thereto via a linkage, gear, or other connection mechanism. Each of the plurality of actuators 66 may be independently controlled.

The power for operating the one or more actuators 66 of the actuation assembly 64 may be generated and managed within the rotating frame of the rotor assembly 28. In an embodiment, the rotor ring 62 is part of the direct drive electric motor 33 mounted about the axis of rotation R and operable to rotate the rotor ring 62 about the axis of rotation R. Examples of an electric motor configured to drive the plurality of rotor blades 30 about the axis of rotation R, and suitable for use with the movable mast 40 described herein include those set forth in U.S. Pat. No. 8,931,732, filed on Jan. 28, 2008, and U.S. patent application Ser. No. 15/296,625 filed on Oct. 18, 2016, the entire contents of both of which are incorporated herein by reference. Wiring associated with the electric motor 33 may extend through a hollow interior of the static mast 34, or alternatively, adjacent the exterior of the movable mast 40.

A tilting coaxial rotor system 12 having a collective only rotor control reduces the mechanical complexity of the flight control system and the need for cyclic pitch control. This reduction in complexity results in a reduction in weight, fewer parts and lower costs relative to more traditional aircrafts. Further, all electrical input necessary to operate the motor 33 resides in the fixed frame of reference, eliminating the need for stationary to rotating power transfer couplings, such as slip rings.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An electric propulsion system comprising:
   an airframe;
   a static mast fixed to the airframe;
   a movable secondary mast positioned in overlapping arrangement with the static mast, the secondary mast defining an axis of rotation;
   an elastomeric bearing arranged at an interface between the static mast and the secondary mast;
   an actuator assembly including at least one actuator connected to the secondary mast, the actuator assembly being operable to pivot the secondary mast relative to the axis of rotation.

2. The electric propulsion system of claim 1, wherein the secondary mast is pivotable up to 10 degees relative to the axis of rotation about a 360 degee azimuth.

3. The electric propulsion system of claim 1, wherein the at least one actuator is positioned between the static mast and the secondary mast.

4. The electric propulsion system of claim 1, wherein the at least one actuator includes at least one first actuator operable to move the secondary mast and the axis of rotation relative to the static mast in a lateral direction and at least one second actuator operable to move the secondary mast and the axis of rotation relative to the static mast in a longitudinal direction.

5. The electric propulsion system of claim 1, wherein the secondary mast has a first end having a first diameter and a second end having a second diameter, the first diameter and the second diameter being different.

6. The electric propulsion system of claim 5, wherein the secondary mast is frusto-conical in shape.

7. The electric propulsion system of claim 1, further comprising:
a first rotor assembly mounted to an exterior surface of the secondary mast, the first rotor assembly including a plurality of first rotor blades rotatable about the axis of rotation in a first direction; and
a second rotor assembly mounted to the exterior surface of the secondary mast, the second rotor assembly including a plurality of second rotor blades rotatable about the axis of rotation in a second direction, opposite the first direction.

8. The electric propulsion system of claim 7, wherein the elastomeric bearing is positioned vertically between the first rotor assembly and the second rotor assembly.

9. The electric propulsion system of claim 7, further comprising:
a first electric motor operable to drive the plurality of first rotor blades about the axis of rotation; and
a second electric motor operable to drive the plurality of second rotor blades about the axis of rotation.

10. The electric propulsion system of claim 7, further comprising:
a first blade pitch actuator mounted within the first rotor assembly and operably coupled to one of the first plurality of rotor blades, the first pitch actuator being operable to rotate the first rotor blade about a blade pitch axis; and
a second pitch actuator mounted within the second rotor assembly and operably coupled to one of the second plurality of rotor blades, the second pitch actuator being operable to rotate the second rotor blade about a blade pitch axis.

11. A rotary-wing aircraft, comprising:
an airframe;
a rotor assembly including:
a static mast fixed to the airframe;
a secondary mast movably mounted about the static mast, the secondary mast defining an axis of rotation;
an elastomeric bearing coupling the secondary mast to the static mast;
an actuator assembly including at least one actuator connected to the secondary mast, the actuator assembly being operable to pivot the secondary mast relative to the axis of rotation;
a first rotor rotatable about the rotor axis in a first direction; and
a second rotor coaxial with the first rotor and rotatable about the rotor axis in a second, opposite direction.

12. The rotary-wing aircraft of claim 11, wherein the at least one actuator assembly is operable to control blade pitch and yaw of the rotary-wing aircraft.

13. The rotary-wing aircraft of claim 11, wherein the at least one actuator assembly is mounted in a fixed reference.

14. The rotary-wing aircraft of claim 13, wherein the at least one actuator assembly is mounted to the airframe.

15. The rotary-wing aircraft of claim 11, wherein the at least one actuator assembly is coupled to the secondary mast via a ball and socket connection.

16. The rotary-wing aircraft of claim 11, further comprising:
a first electric motor configured to drive the first rotor about the rotor axis, the first electric motor being mounted at least partially within a rotor hub of the first rotor; and
a second electric motor configured to drive the second rotor about the rotor axis, the second electric motor being mounted at least partially within a rotor hub of the second rotor.

17. The rotary-wing aircraft of claim 16, further comprising:
a first pitch actuator associated with the first rotor, the first pitch actuator being operable to rotate at least one rotor blade of the first rotor about a blade pitch axis; and
a second pitch actuator associated with the second rotor, the second pitch actuator being operable to rotate at least one rotor blade of the second rotor about a blade pitch axis.

18. The rotary-wing aircraft of claim 17, wherein the first pitch actuator and the second pitch actuator provide a quasi-static input for thrust and yaw control.

19. The rotary-wing aircraft of claim 17, wherein power for operating the first pitch actuator is generated and managed within the first rotor and power for operating the second pitch actuator is generated and managed within the second rotor.

20. The rotary-wing aircraft of claim 11, wherein the secondary mast is pivotable up to 10 degees relative to the rotor axis about a 360 degee azimuth.

* * * * *